United States Patent
Cros et al.

(10) Patent No.: US 11,434,780 B2
(45) Date of Patent: Sep. 6, 2022

(54) AIR-CONDITIONING SYSTEM FOR AN AIRCRAFT CABIN, COMPRISING A TURBOMACHINE PROVIDED WITH A RADIAL TURBINE DISTRIBUTOR

(71) Applicant: LIEBHERR-AEROSPACE TOULOUSE SAS, Toulouse (FR)

(72) Inventors: Sandrine Cros, Toulouse (FR); Mathieu Roumeas, Toulouse (FR); James Fouragnan, Toulouse (FR); Pierre-Thomas Lauriau, Toulouse (FR); Nicolas Binder, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 0 days.

(21) Appl. No.: 17/252,244

(22) PCT Filed: Jun. 14, 2019

(86) PCT No.: PCT/FR2019/051448
§ 371 (c)(1),
(2) Date: Dec. 14, 2020

(87) PCT Pub. No.: WO2019/239076
PCT Pub. Date: Dec. 19, 2019

(65) Prior Publication Data
US 2021/0254495 A1  Aug. 19, 2021

(30) Foreign Application Priority Data

Jun. 14, 2018  (FR) ........................... 1855210

(51) Int. Cl.
*F01D 17/16* (2006.01)
*F01D 9/04* (2006.01)

(52) U.S. Cl.
CPC ......... *F01D 17/165* (2013.01); *F01D 17/162* (2013.01); *F01D 9/041* (2013.01);
(Continued)

(58) Field of Classification Search
CPC ...... F01D 17/165; F01D 17/167; F01D 9/041; F01D 9/0945
See application file for complete search history.

(56) References Cited

U.S. PATENT DOCUMENTS 2,739,782 A * 3/1956 White ................... F01D 9/045
                                                   415/17
4,403,914 A * 9/1983 Rogo ................... F01D 17/143
                                                   415/150

(Continued)

FOREIGN PATENT DOCUMENTS

EP       1128025        8/2001
WO   WO2014044364       3/2014

*Primary Examiner* — Courtney D Heinle
*Assistant Examiner* — Michael K. Reitz
(74) *Attorney, Agent, or Firm* — CRGO Global; Steven M. Greenberg

(57) ABSTRACT

The invention relates to an air conditioning system for an aircraft comprising a turbine engine comprising at least one radial turbine and a compressor, said radial turbine extending along a central axis (10) and comprising a wheel (20) equipped with vanes (21) mounted so as to be able to rotate about said central axis (10), a nozzle (30) arranged at the periphery of said wheel (20) comprising a plurality of variable-pitch blades (31) arranged around said central axis (10), and a volute (12) comprising an air inlet (12*a*) and an air outlet (12*b*) opening onto said plurality of variable-pitch blades (31), characterized in that said variable-pitch blades (31) are arranged around said central axis (10) between two nozzle casing walls (11*a*, 11*b*) delimiting an air passage section of said nozzle between them, each variable-pitch
(Continued)

Figure 1:
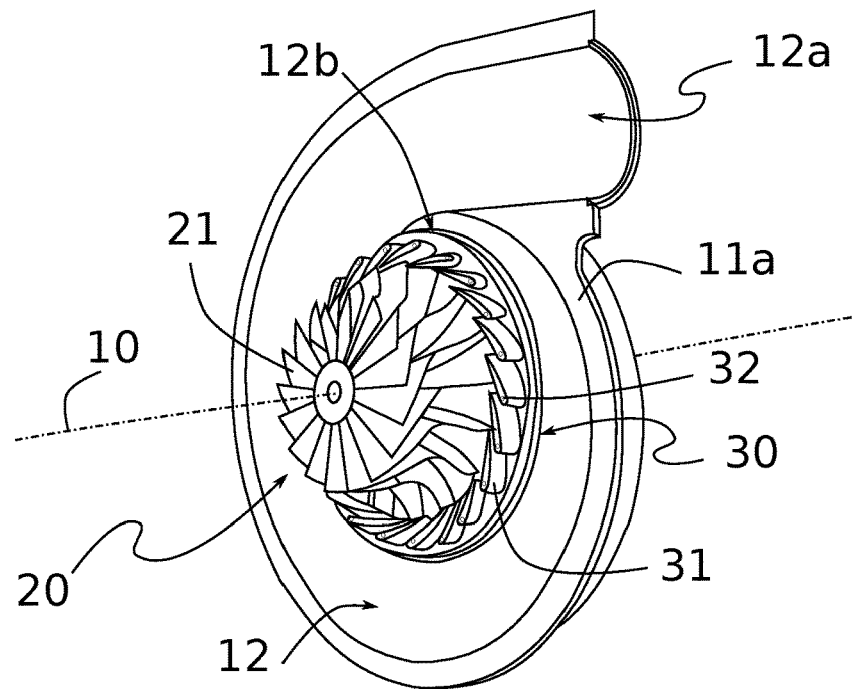

blade (31) further comprising means for axial displacement of the blade between the two casing walls (11*a*, 11*b*).

5 Claims, 2 Drawing Sheets

(52) U.S. Cl.
CPC ............ *F01D 9/045* (2013.01); *F01D 17/167* (2013.01); *F05D 2220/323* (2013.01); *F05D 2240/128* (2013.01); *F05D 2250/52* (2013.01)

(56) References Cited

U.S. PATENT DOCUMENTS

| | | | |
|---|---|---|---|
| 5,452,986 A * | 9/1995 | Osborne | F04D 29/462 |
| | | | 415/150 |
| 2005/0260067 A1* | 11/2005 | Parker | F02C 6/12 |
| | | | 415/160 |
| 2014/0147278 A1 | 5/2014 | Demolis et al. | |
| 2018/0119609 A1 | 5/2018 | Ehrhard et al. | |
| 2018/0334920 A1* | 11/2018 | Hu | F01D 17/16 |

* cited by examiner

AIR-CONDITIONING SYSTEM FOR AN AIRCRAFT CABIN, COMPRISING A TURBOMACHINE PROVIDED WITH A RADIAL TURBINE DISTRIBUTOR

CROSS-REFERENCE TO RELATED APPLICATIONS

This application is a § 371 national phase entry of International Application No. PCT/FR2019/051448, filed Jun. 14, 2019, which claims priority to French Patent Application No. 1855210, filed Jun. 14, 2018.

1. TECHNICAL FIELD OF THE INVENTION

The invention relates to an air conditioning system for an aircraft cabin comprising a turbine engine equipped with a nozzle of a radial turbine of the turbine engine.

2. TECHNOLOGICAL BACKGROUND

An air conditioning system conventionally comprises a device for collecting compressed air on at least one compressor of a propulsion engine of the aircraft and an air-cycle turbine engine comprising at least one compressor and one radial turbine, the compressor being supplied with air by the device for collecting compressed air after passing through a flow rate or pressure regulating valve, and the turbine comprising an air outlet supplying the cabin at a controlled temperature and flow rate. The system further includes various heat exchangers, control valves and a water extraction loop.

Different solutions are currently proposed to limit the air collection on propulsion engines and which in particular consist in providing more electric air conditioning systems.

This transition to electrification of the air conditioning system makes it necessary to optimize the various constituent elements of the system and in particular of the turbine of the air-cycle turbine engine.

This turbine should make it possible to ensure a wide range of air flow rates while providing the maximum possible power over the entire operating range.

In particular, the turbine must be able to operate from a maintenance phase of the aircraft on the ground (which corresponds to a low flow rate and a high expansion rate) to a cruising flight phase of the aircraft, which corresponds to a high flow rate and a low expansion rate).

It has already been proposed to provide a turbine with a variable injection section. In a known manner, such a turbine comprises a casing, a wheel movable in rotation about a central axis equipped with vanes, and a nozzle arranged on the periphery of the movable wheel and comprising a plurality of blades for guiding the air flow.

There are currently two main solutions making it possible to vary the injection section of such a radial turbine.

The first solution consists in modifying the air passage section by the displacement of the casing in axial translation, which makes it possible to increase the height of the air stream for a given profile and blade pitch. This solution has the drawback of being able to cause a partial air intake at the wheel inlet, which generates secondary flows at the leading edge of the wheel and therefore degrades the performance of the stage. Document U.S. Pat. No. 2,739,782 for example describes a turbine with a variable injection section according to this first solution. The second solution consists in modifying the air passage section by pivoting the blades of the turbine nozzle so that for a given profile and height of the air stream, the angle of the nozzle blades can be modified. This solution requires the presence of a mechanical clearance at the nozzle so as to allow the rotation of the blades, which reduces the efficiency of the stage. In addition, since the range of variation of the desired injection section is generally large (for example of the order of 1:4), there is a risk of mismatching of the wheel inlet for extreme openings or closings. There is also a risk of jamming at the wheel inlet. Document EP0332354 for example describes a turbine with a variable injection section according to this second solution.

None of the currently known solutions therefore makes it possible to modify the injection section over a wide range of flow rates while maintaining a level of performance and reliability which is compatible with the needs of air conditioning systems.

There is therefore a need to have an alternative solution enabling the drawbacks of the known solutions to be overcome.

3. OBJECTIVES OF THE INVENTION

The invention aims to provide an air conditioning system comprising a turbine engine comprising a radial turbine equipped with a nozzle which overcomes at least some of the drawbacks of the known solutions.

The invention in particular aims to provide, in at least one embodiment, such a system which comprises a nozzle of a radial turbine which makes it possible to modify the injection section of the turbine over a wide range of flow rates while maintaining a level of performance and reliability which is compatible with aeronautical applications.

4. DESCRIPTION OF THE INVENTION

To do this, the invention relates to an air conditioning system for an aircraft comprising a turbine engine comprising at least one radial turbine and a compressor, said radial turbine extending along a central axis and comprising a wheel equipped with vanes mounted so as to be able to rotate about said central axis, a nozzle arranged at the periphery of said wheel comprising a plurality of variable-pitch blades arranged around said central axis, and a volute comprising an air inlet and an air outlet opening onto said plurality of variable-pitch blades.

The air conditioning system is characterized in that said variable-pitch blades are arranged around said central axis between two nozzle casing walls delimiting an air passage section of said nozzle between them, each variable-pitch blade further comprising means for axial displacement of the blade between the two casing walls.

The invention therefore makes it possible to displace the blades along the direction of the central axis of the air stream delimited by the nozzle casings. The inventors have unexpectedly realized that the performance of the stage is better when the clearance is present at the root of the blade rather than at the tip of the blade for small openings and when the clearance is present at the tip of the blade rather than at the root of the blade for large openings. The concept of small opening and large opening depends on the type of machine considered. The ratio between the section of a small opening to the section of a large opening is generally of the order of 1:4.

As a result, the axial displacement of the blades in the air stream makes it possible to improve the performance of the expansion stage. The position of the blade in the air stream makes it possible to increase or limit the vortices in the air stream and therefore to modify the air flow performance. Note that, according to the invention, for intermediate openings between small openings and large openings, the performance is improved for clearances distributed between the blade tip and the blade root. Different configurations are possible depending on the considered machine.

Advantageously and according to the invention, each variable-pitch blade further comprises means for pivoting the blade about a pivot axis which are coupled to said means for axial displacement of the blade between the two casing walls so that each blade can, upon actuation of said axial displacement means and said pivoting means by control means, be simultaneously pivoted about said pivot axis and displaced axially between the two casing walls, so as to be able to modify the air passage section from upstream to downstream of the nozzle.

The invention therefore makes it possible to simultaneously modify the angle of the blades of the nozzle and their axial position within the air stream.

The pivoting simultaneous with the axial displacement makes it possible to modify the injection section while improving the performance of the expansion stage.

Advantageously and according to the invention, each variable-pitch blade is secured to a threaded shaft extending parallel to said central axis along said pivot axis, and cooperating with at least one combined internal thread formed in one of said casing walls so that this blade can, upon actuation of said threaded shaft by said control means, be simultaneously pivoted about said pivot axis and displaced axially between the two housing walls, this threaded shaft forming said means for axial displacement of the blade and said means for pivoting of the blade.

This advantageous variant makes it possible to simultaneously combine the pivoting of the blade and the axial displacement of the blade in the air stream by a single means, formed by a threaded shaft which cooperates with at least one internal thread formed in a casing wall. A single control of the threaded shaft therefore makes it possible both to pivot the blade and to displace it in the air stream.

According to this advantageous variant, the thread of the shaft and the combined thread of the internal thread condition the displacement of the blade and therefore form the displacement law of the blade, both in pivoting and in axial translation in the air stream.

Advantageously and according to the invention, said threaded shaft of each blade has a non-regular thread so as to be able to define a law for controlling the displacement of the non-linear blade.

According to this variant, a non-regular thread makes it possible to define a law for controlling the displacement of the blade which is non-linear. It is then possible to define the various operating points of the nozzle solely by the characteristics of the threads.

Advantageously and according to the invention, said threaded shaft of each variable-pitch blade extends on either side of said blade so as to be able to cooperate with two combined internal threads which are formed respectively in each of the two nozzle casing walls.

This advantageous variant in particular allows better nozzle control.

Advantageously and according to the invention, said control means of said variable-pitch blades are configured to be able to simultaneously actuate the pivot shaft of each blade.

This advantageous variant makes it possible to simplify the control of the blades by providing a single control means for all of the blades of the nozzle.

Advantageously and according to the invention, the nozzle comprises at least twelve variable-pitch blades which are evenly distributed around the central axis.

It is nevertheless possible to design variant embodiments comprising less than twelve variable-pitch blades and/or variable-pitch blades which are distributed unevenly around the central axis.

The invention also relates to an aircraft comprising a cabin to be supplied with air at a pressure and a temperature which are controlled by an air conditioning system according to the invention.

The invention also relates to an air conditioning system characterized in combination by all or some of the features mentioned above or below.

5. LIST OF FIGURES

Figures 2A, 2B:
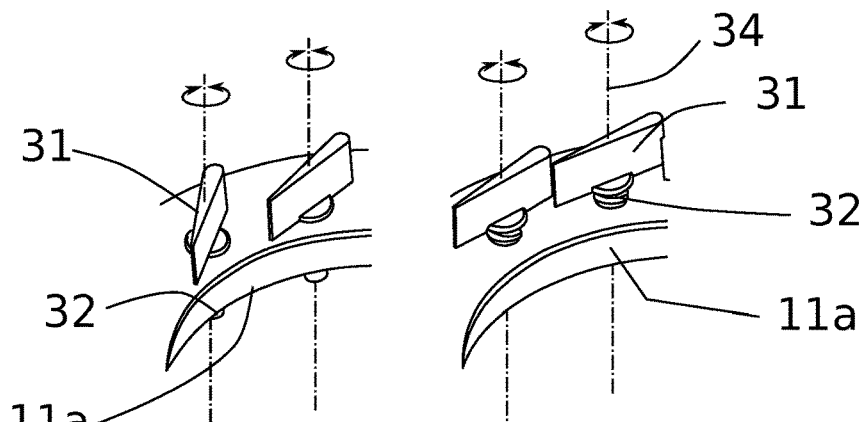
Figures 3A, 3B:
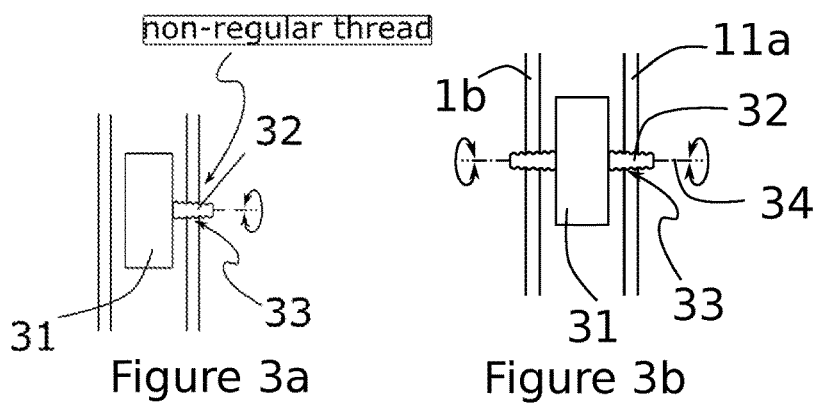
Figure 4:
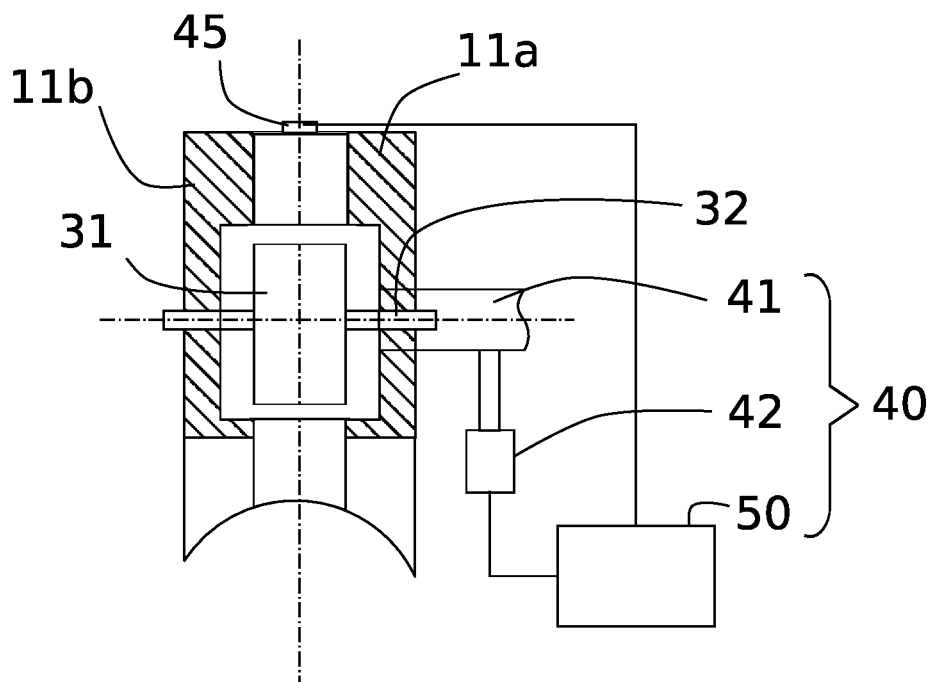
Figure 5:
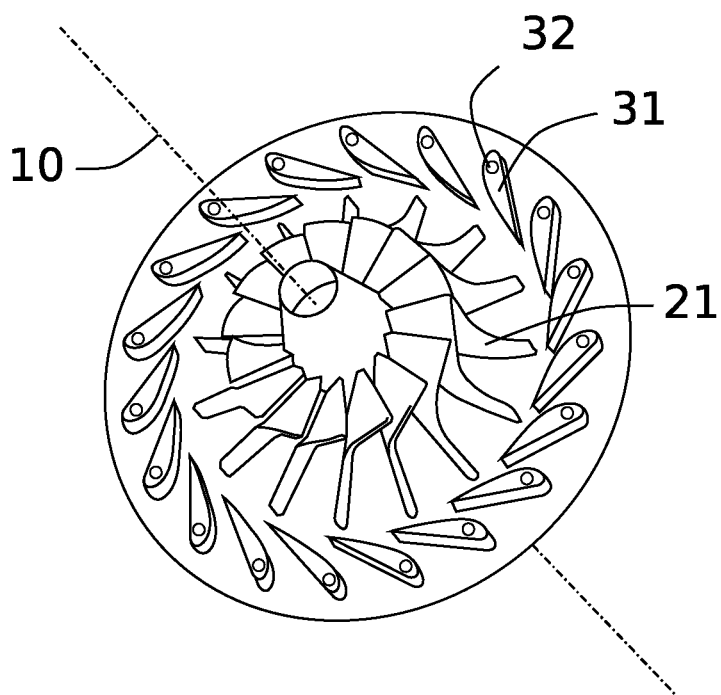

Further aims, features and advantages of the invention will become apparent upon reading the following description, which is provided solely by way of non-limiting example, and which refers to the appended figures, in which:

FIG. 1 is a schematic perspective view of a turbine of an air conditioning system according to one embodiment of the invention equipped with a nozzle according to one embodiment of the invention, FIGS. 2*a* and 2*b* are partial perspective schematic views of a portion of the nozzle of an air conditioning system according to one embodiment of the invention, FIGS. 3*a* and 3*b* are schematic sectional views of a portion of the nozzle of an air conditioning system according to one embodiment of the invention, FIG. 4 is a partial schematic sectional view of the nozzle of an air conditioning system according to one embodiment of the invention in a longitudinal plane of the turbine along its axis of rotation, FIG. 5 is a schematic perspective view of a turbine wheel and of a turbine nozzle of an air conditioning system according to one embodiment of the invention.

6. DETAILED DESCRIPTION OF AN EMBODIMENT OF THE INVENTION

For the sake of illustration and clarity, the scales and proportions are not strictly adhered to in the figures. Throughout the detailed description which follows with reference to the figures, unless otherwise indicated, each element of the nozzle is described as it is arranged when the nozzle is mounted on a turbine. This arrangement is shown in particular in FIG. 1.

In addition, identical, similar or analogous elements are denoted using the same reference signs throughout the figures.

FIG. 1 schematically illustrates a radial turbine of an air conditioning system according to one embodiment of the invention which extends along a central axis 10 and comprises a wheel 20 which is movable in rotation about the central axis 10 and a nozzle 30 arranged at the periphery of the wheel 20 on casings 11*a*, 11*b* (of which only the casing 11*a* is shown in FIG. 1). The wheel 20 is equipped with a plurality of vanes 21.

The turbine also includes a volute 12 (a half-volute of which is shown in FIG. 1), the diameter of which decreases between an inlet 12*a* and an outlet 12*b* which opens onto the nozzle 30.

The nozzle 30 also comprises a plurality of variable-pitch blades 31, each variable-pitch blade 31 being secured to a threaded shaft 32 which extends parallel to the central axis 10.

FIG. 5 schematically illustrates, in perspective, the wheel 20 and the nozzle 30 of the turbine according to one embodiment.

In FIGS. 1 and 5, the blades 31 of the nozzle are shown with a threaded shaft arranged in the vicinity of the leading edge of the blades while FIGS. 2a and 2b illustrate the threaded shaft arranged in the middle of the blades. Both embodiments are possible, as is the embodiment, not shown in the figures, according to which the threaded shaft is arranged in the vicinity of the trailing edge of the blade.

As shown in FIGS. 2a and 2b, each threaded shaft 32 of each blade 31 cooperates with at least one internal thread 33 formed in one of the casing walls 11a, 11b so that this blade 31 can, upon command from control means 40 (shown schematically in FIG. 4), be simultaneously pivoted about its pivot axis and displaced axially between the two casings 11a, 11b within the air stream, so as to modify the air passage section from upstream to downstream of the nozzle. This threaded shaft 32 and the combined internal thread 33 can be of any type.

The thread of the shaft 32 and the combined thread of the internal thread can be regular or irregular threads. The characteristics of the thread condition the displacement law of the blade in the air stream of the nozzle.

FIGS. 2a and 2b schematically illustrate the displacement principle of the blades 31 relative to one of the walls of the casing 11a. FIG. 2a illustrates the blades 31 in a screwed position of the blades, that is to say, a position in which the threaded shaft 32 of each blade 31 is screwed into the combined internal thread formed in the wall of the casing 11 a arranged opposite. FIG. 2b illustrates the same blades 31 in a deployed position, that is to say, a position in which the blades are simultaneously pivoted with respect to the position of FIG. 2a and displaced axially relative to the casing 11a.

Thus, a single control of the blades 31 makes it possible both to modify the angle of the blade 31 and the position of the blade in the air stream of the nozzle delimited by the two casings 11a, 11b.

FIGS. 3a and 3b schematically illustrate the blades 31 in section according to two possible embodiments of the invention. FIG. 3a illustrates an embodiment in which the blade 31 is carried by a threaded shaft 32 which cooperates with a combined internal thread formed in a single wall of the casing. FIG. 3b illustrates an embodiment in which the blade 31 is carried by two threaded shafts 32 which extend on either side of the blade and which each cooperate with a combined internal thread respectively formed in each wall of the casing.

FIG. 4 schematically illustrates the blade 31 and the control means 40 for setting the blade. These control means 40 for example comprise a shaft 41 which is mechanically connected to the threaded shaft 32. This mechanical connection can for example comprise arms, pinions, bearings which are connected to electric or electromagnetic actuators 42 making it possible to mechanically connect the control shaft 41 and the displacement shaft 32 of the blade 31. According to a preferred embodiment, a single actuator can be configured for all of the blades 31 of the nozzle.

The actuators 42 are controlled by a central control unit 50. This control can be of any type. According to one embodiment, the control depends on the information supplied by a pressure sensor 45. Thus, depending on the pressure measurements, the opening or closing of the blades 31 of the nozzle can be controlled.

An air conditioning system may also comprise a set of members enclosed in a casing and having air inlet and outlet connection ports and a dynamic air circulation channel, better known under the term of RAM air, through one or more heat exchangers. Such a pack can be the subject of numerous variant embodiments which are compatible with the invention. For example, it can comprise at least one air-cycle turbine engine which comprises a compressor and a turbine connected to one another by a rotating shaft. The turbine engine may also comprise a fan configured to ensure dynamic air circulation through the heat exchangers.

According to another variant, the turbine engine can comprise an electric motor so as to form an electric air conditioning pack. The pack may also comprise a water extraction loop and a turbine engine outlet pipe connected to a mixing chamber which opens into the cabin to be supplied with air at a controlled temperature and pressure. The turbine of the air cycle machine is, according to the invention, equipped with a nozzle according to the invention, which allows the turbine to ensure a wide range of air flow rates while delivering the maximum possible power over the entire operating range.

The principle of the invention could also be applied to a variable diffuser of a centrifugal compressor.

The invention claimed is:

1. An air conditioning system for an aircraft comprising a turbine engine comprising at least one radial turbine and a compressor, said radial turbine extending along a central axis and comprising a wheel equipped with vanes mounted so as to be able to rotate about said central axis, a nozzle arranged at the periphery of said wheel comprising a plurality of variable-pitch blades arranged around said central axis, and a volute comprising an air inlet and an air outlet opening onto said plurality of variable-pitch blades, characterized in that said variable-pitch blades are arranged around said central axis between two nozzle casing walls delimiting an air passage section of said nozzle between them, each variable-pitch blade further comprising means for axial displacement of the blade between the two casing walls;

wherein each variable-pitch blade of said nozzle further comprises means for pivoting the blade about a pivot axis which are coupled to said means for axial displacement of the blade between the two casing walls so that each blade can, upon actuation of said axial displacement means and said pivoting means by control means, be simultaneously pivoted about said pivot axis and displaced axially between the two casing walls, so as to be able to modify the air passage section from upstream to downstream of the nozzle;

wherein each variable-pitch blade of said nozzle is secured to a threaded shaft extending parallel to said central axis along said pivot axis, and cooperating with at least one combined internal thread formed in one of said casing walls so that this blade can, upon actuation of said threaded shaft by said control means, be simultaneously pivoted about said pivot axis and displaced axially between the two housing walls, this threaded shaft forming said means for axial displacement of the blade and said means for pivoting of the blade; and wherein said threaded shaft of each blade of said nozzle has a non-regular thread so as to be able to define a law for controlling the displacement of the blade which is non-linear.

2. The system according to claim 1, wherein said threaded shaft of each variable-pitch blade of said nozzle extends on either side of said blade so as to be able to cooperate with two combined internal threads which are formed respectively in each of the two nozzle casing walls.

3. The system according to claim 1, wherein said control means of said variable-pitch blades of said nozzle are configured to be able to simultaneously actuate the threaded shaft of each blade.

4. The system according to claim 1, wherein said nozzle comprises at least twelve variable-pitch blades which are evenly distributed around the central axis.

5. An aircraft comprising at least one cabin supplied with air at a temperature and pressure controlled by an air conditioning system, wherein said air conditioning system comprises a turbine engine comprising at least one radial turbine and a compressor, said radial turbine extending along a central axis and comprising a wheel equipped with vanes mounted so as to be able to rotate about said central axis, a nozzle arranged at the periphery of said wheel comprising a plurality of variable-pitch blades arranged around said central axis, and a volute comprising an air inlet and an air outlet opening onto said plurality of variable-pitch blades, characterized in that said variable-pitch blades are arranged around said central axis between two nozzle casing walls delimiting an air passage section of said nozzle between them, each variable-pitch blade further comprising means for axial displacement of the blade between the two casing walls;

wherein each variable-pitch blade of said nozzle further comprises means for pivoting the blade about a pivot axis which are coupled to said means for axial displacement of the blade between the two casing walls so that each blade can, upon actuation of said axial displacement means and said pivoting means by control means, be simultaneously pivoted about said pivot axis and displaced axially between the two casing walls, so as to be able to modify the air passage section from upstream to downstream of the nozzle;

wherein each variable-pitch blade of said nozzle is secured to a threaded shaft extending parallel to said central axis along said pivot axis, and cooperating with at least one combined internal thread formed in one of said casing walls so that this blade can, upon actuation of said threaded shaft by said control means, be simultaneously pivoted about said pivot axis and displaced axially between the two housing walls, this threaded shaft forming said means for axial displacement of the blade and said means for pivoting of the blade; and wherein said threaded shaft of each blade of said nozzle has a non-regular thread so as to be able to define a law for controlling the displacement of the blade which is non-linear.

* * * * *